Nov. 27, 1962  H. J. BLOMQUIST  3,066,096
METHOD FOR PURIFICATION OF SALINE WATER
Filed June 2, 1959
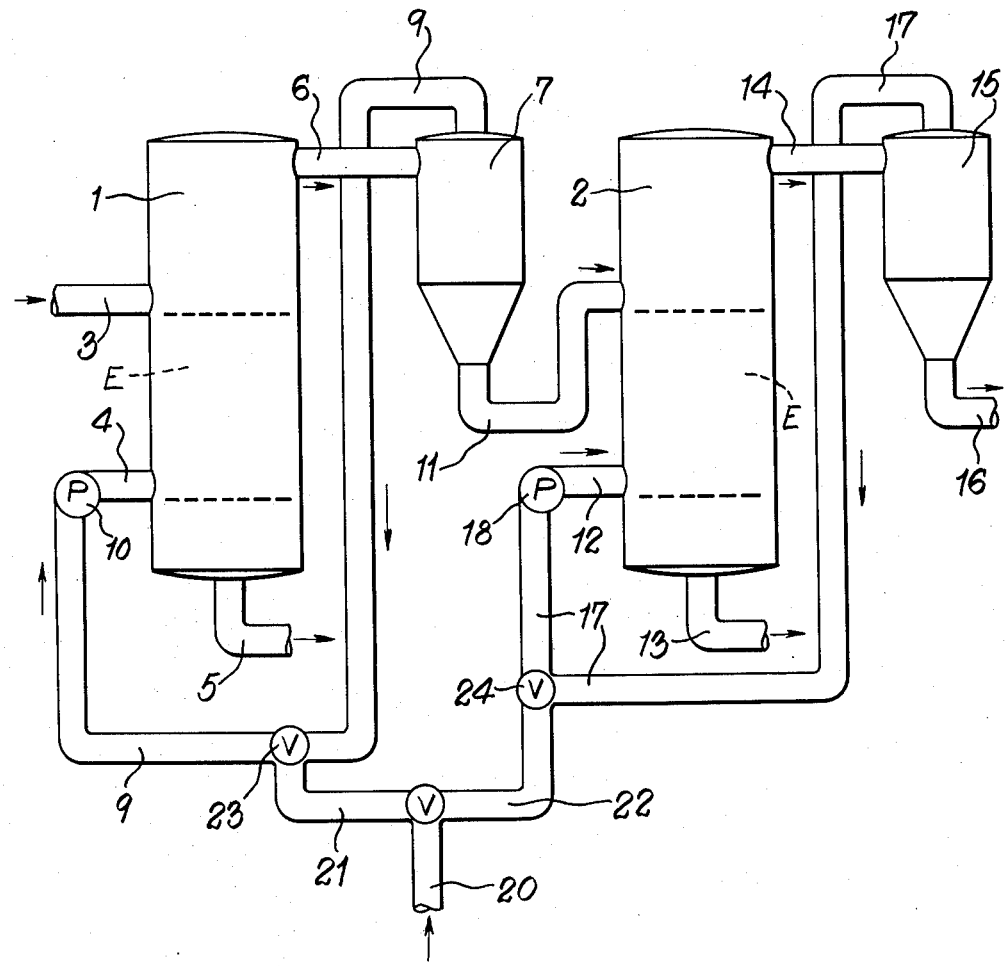
INVENTOR.
HOWARD J. BLOMQUIST
BY Davis, Hoxie,
Faithfull & Hapgood
ATTORNEYS 3,066,096
METHOD FOR PURIFICATION OF SALINE WATER
Howard J. Blomquist, Hamilton, Ohio
(916 Centre Ave., Reading, Pa.)
Filed June 2, 1959, Ser. No. 817,530
9 Claims. (Cl. 210—59)

This invention relates to the purification of saline water by solvent extraction and has particular reference to an improved method and apparatus for this purpose.

It has been proposed heretofore to obtain fresh water from saline water, such as sea water, by solvent extraction of a liquid-liquid type. That is, a definite solvent phase containing absorbed fresh water is obtained which is separate and distinct from the concentrated brine phase. Thus, the solvent used is essentially insoluble in water and in general is a compound of relatively heavy molecular weight. When amines have been used as the solvent, it appears that they precipitate magnesium and form salts which are difficult to remove from the water solution. The magnesium compound precipitates in the solvent-fresh water phase and contaminate the solvent, thereby making any solvent recovery difficult and expensive.

An object of the present invention is to provide a solvent extraction method for purifying saline water, which overcomes the above-mentioned difficulties.

According to the invention, the solvent is an amine of low molecular weight which is gaseous at ordinary temperatures and pressures and is substantially soluble in water, the amine being selected from the group consisting of alkyl secondary and tertiary amines, such as dimethylamine or trimethylamine or a mixture of both. This solvent, in sufficient concentration, combines with water molecules to form a mixture of hydrated amine and brine. The solvated water molecules have a lower specific gravity than the brine and therefore segregate from the heavier density brine water. Thus, the lighter solvated water molecules migrate to the top of such a system, and the displaced heavier brine is found with increasing concentration as the bottom of the system is approached. The solvated water is then drawn from the top of the system and passed through an evaporation stage where, at a temperature above that in the extraction phase, the bonding of solvent and water molecules is broken and the solvent is released as a gas. The solvent gas is then returned to the extraction phase of the system.

As indicated above, with the presence of magnesium compounds in most saline waters, the use of the proposed method for saline water purification would result in the precipitation of magnesium hydroxide due to a pH of 10 or higher in the resultant mixture. However, such a precipitate becomes the heaviest fraction and settles out to the bottom of the system. It is therefore seen that this process provides a means of obtaining a solvent hydrate which is not contaminated with precipitate as is found when using liquid amines to form a solvent hydrate.

The extraction process of the present invention thus utilizes the selective solvent capacity of a low molecular weight gaseous alkyl secondary or tertiary amine, that is, the phenomena of the hydrogen bonding of these amines with water molecules. By dissolving such an amine in saline water, through use of a countercurrent type of extraction system, the solvated water molecules (the hydrogen-bonded amine and water molecules) rise to the top of the countercurrent extraction system by virtue of the lower specific gravity of this solution relative to the remaining brine. The solvated water is removed from the countercurrent extraction system to an evaporation unit where sufficient heat is applied to break the hydrogen bonds formed between the amine and water molecules. The solvent gas is then recycled to the countercurrent extraction system and the purified water passes to successive extraction stages until the desired level of purification is attained or until that extraction stage is reached at which the specific gravity differential is negligible or essentially zero between the solvent inlet at the bottom of the countercurrent extraction system and the solvated water exit at the top of the system.

For a better understanding of the invention, reference may be had to the accompanying drawing, in which the single illustration is a schematic view of an apparatus for use in carrying out the new method.

Referring to the drawing, the reference numerals 1 and 2 designate countercurrent extraction columns, each of which has an extraction zone E containing baffles (not shown), as is common practice for obtaining increased contact of solvent with solute. Saline water from feed line 3 enters the first column 1 through an inlet at the upper part of its extraction zone E, while the solvent enters this column through supply line 4 leading to an inlet at the lower part of the extraction zone. Discharge lines 5 and 6 extend from the bottom of column 1 and from the upper part of this column, respectively.

As previously mentioned, the solvent entering column 1 through supply line 4 is an amine of low molecular weight selected from the group consisting of secondary and tertiary amines, such as dimethyl amine or trimethyl amine, the amine being substantially soluble in water and gaseous at ordinary temperatures and pressures. This amine solvent, in the form of a compressed gas, flows upwardly in column 1 countercurrently to the saline water entering from feed line 3. Thus, at least a substantial part of the solvent gas dissolves in the water, forming a solvent-water solution and concentrated brine water. The latter, being of substantially higher specific gravity than the solvent-water solution, settles to the lower part of column 1 and is discharged through the brine water line 5, while the solvent-water solution rises to the top of this column and is discharged through the purified water line 6.

The purified water line 6 leads from the upper part of column 1 to an evaporator 7, where the solvent-water solution is heated sufficiently to separate the gaseous amine solvent from the water. A temperature of about 33° C. or higher is suitable for this purpose. The separated amine gas is discharged from the upper part of the evaporation unit 7 into a return line 9, through which it is conducted to the supply line 4 for the solvent entering the column 1. As shown, a pump 10 is inserted in the return line 9, so that the solvent gas is supplied under pressure to the column 1 through supply line 4.

Extending from the bottom of evaporator 7 is a discharge line 11 for the purified water from which the solvent gas has been removed. This water line 11 leads to an inlet of the second counter current extraction column 2 at the upper part of its extraction zone E. At the lower part of this extraction zone, the column 2 has an inlet through which solvent gas is fed from a supply line 12, this gas being similar to the solvent gas used in the first column 1. It will be understood that the extraction operation in column 2 is similar to that occuring in column 1, with the formation of concentrated brine water as a heavier component and a solvent-water solution as a lighter component. The brine water, which settles to the bottom of column 2, is discharged through line 13, while the solvent-water solution rises to the top of column 2 and is discharged through a purified water line 14.

From the line 14, the solvent-water solution passes into a second evaporator 15, where the solution is again heated to a temperature sufficient to separate the gaseous solvent from the water. The purified water, from which the gaseous solvent has been removed, discharges from the bottom of evaporator 14 through a purified water line 16, while the recovered gaseous solvent discharges from the top of evaporator 15 into a return line 17. Through line 17, gaseous solvent is conducted to the solvent supply line 12 and the second column 2, a pump 18 being inserted in return line 17 to feed the solvent gas under pressure into column 2.

A supply line 20 for primary or fresh solvent gas is provided with branch lines 21 and 22 leading to the return lines 9 and 17, respectively. Thus, to the extent that the solvent is not recovered in the evaporators and returned to the extraction columns 1 and 2, the solvent supply may be replenished from the supply line 20, as by operation of valves 23 and 24.

The proportions of solvent and saline water introduced into each of the extraction columns 1 and 2 will depend upon the salt content of the saline water entering the column. In general, the amine solvent should be supplied to each column in a sufficient quantity such that, upon dissolving in the water, the resulting solvent-water solution has a minimum of about 70% by weight of solvent, to provide a solution density of about 0.82 gm./cc. or less at approximately 20° C. The specific gravity of the solvent-water solution will then be sufficiently less that that of the concentrated brine water, to enable the latter to settle in the extraction column, thereby providing an effective separation of concentrated brine water from solvent-water solution.

While I have described separation of the solvent-water solution from the concentrated brine water by gravity settling in each countercurrent extraction column, such separation may be effected in a settling zone outside the column, and the separation may be accelerated by the use of a centrifugal separator. Also, water from the discharge line 16 of the second evaporating zone 15 may be passed to one or more additional extraction stages until the desired degree of purity is attained.

In some instances, it may be desirable to recover amine solvent from the concentrated brine phase discharging through lines 5 and 13. This solvent recovery may be effected by passing the brine water in the discharge lines 5 and 13 to a centrifugal separator (not shown), where the amine solvent is separated as a lighter component, the brine water being of higher specific gravity. The solvent thus concentrated in this lighter separated component may then be further concentrated in any suitable manner, as by evaporation. Alternately, the recovery of solvent from the concentrated brine phase may be effected in a conventional absorption-type apparatus with silica gel or activated charcoal as an adsorption agent.

I claim:

1. In the purification of saline water by solvent extraction, the process which comprises contacting the saline water in an extraction zone with an amine of low molecular weight, said amine being in gaseous form and selected from the group consisting of alkyl secondary and tertiary amines, said amine being gaseous at ordinary temperatures and pressures and being substantially soluble in water, thereby forming in said zone a solution of amine solvent and purified water as a lighter component and brine water as a heavier component, separating said solution from the brine water by the difference in the specific gravities of said components, passing the separated solution through an evaporation zone and there separating amine as a gaseous solvent from the purified water, and returning the separated amine solvent from the evaporation zone to said extraction zone for contact with a further quantity of saline water.

2. The process according to claim 1, in which the separation of said solution from the brine water is effected in said extraction zone by gravity settling of the brine water, the separated solution passing to the evaporation zone being withdrawn from the upper part of the extraction zone.

3. The process according to claim 1, in which the amine solvent is introduced into the lower part of the extraction zone and the saline water is introduced into the upper part of the extraction zone, said contacting being effected by countercurrent flow of the saline water and amine solvent in the extraction zone.

4. The process according to claim 1, in which said contacting is effected by countercurrent flow of the saline water and the amine solvent in the extraction zone, the separated solution being withdrawn from the upper part of the extraction zone, the process comprising also the step of withdrawing brine water from the lower part of the extraction zone.

5. The process according to claim 1, in which the amine solvent is introduced into the extraction zone in an amount sufficient to provide said solution with a minimum of about 70% solvent by weight.

6. The process according to claim 1, in which the amine solvent is introduced into the extraction zone in an amount sufficient to provide said solution with a minimum of about 70% solvent by weight and with a solution density no greater than about 0.82 gm./cc. at 20° C.

7. The process according to claim 1, in which the separated solution in the evaporation zone is heated to at least about 33° C.

8. The process according to claim 1, comprising also the steps of passing the purified water from the evaporation zone to a second extraction zone and there contacting it with a further quantity of amine solvent as defined in claim 1, thereby forming in the second extraction zone a solution of amine solvent and purified water as a lighter component and brine water as a heavier component, separating said last solution from said last brine water by the difference in the specific gravities of said last components, passing the separated solution from the second extraction zone through a second evaporation zone and there separating amine as a gaseous solvent from the purified water, and returning the separated amine solvent from the second evaporation zone to the second extraction zone for contact with a further quantity of water from the first evaporation zone.

9. The process according to claim 1, comprising also the step of treating said brine water, after separation of said solution therefrom, to recover residual amine solvent from the brine water.

References Cited in the file of this patent

UNITED STATES PATENTS 2,904,511    Donath _____ Sept. 15, 1959

OTHER REFERENCES

Chemical and Engineering News, vol. 37, No. 5, February 2, 1959, pp. 40, 42.

"The Hydrate Theory of Solutions," Pickering, Journal of the Chemical Society, 1893, vol. 63, pp. 141–195.

"Demineralization of Saline Waters," Bureau of Mines, October 1952, pp. 29 and 38.

"Saline Water Conversion Report for 1957," U.S. Dept. of Interior, January 1958, pp. 66–69.